United States Patent
Yamada et al.

(10) Patent No.: US 6,954,830 B2
(45) Date of Patent: Oct. 11, 2005

(54) DATA RECORDING METHOD, DATA RECORDER, AND RECORDING MEDIUM

(75) Inventors: Makoto Yamada, Tokyo (JP); Toshihiro Ishizaka, Kanagawa (JP); Mitsuhiro Hirabayashi, Tokyo (JP)

(73) Assignee: Sony Corporation, Tokyo (JP)

( * ) Notice: Subject to any disclaimer, the term of this patent is extended or adjusted under 35 U.S.C. 154(b) by 232 days.

(21) Appl. No.: 10/204,592

(22) PCT Filed: Dec. 25, 2001

(86) PCT No.: PCT/JP01/11340

§ 371 (c)(1),
(2), (4) Date: Aug. 22, 2002

(87) PCT Pub. No.: WO02/052847

PCT Pub. Date: Jul. 4, 2002

(65) Prior Publication Data

US 2003/0093634 A1 May 15, 2003

(30) Foreign Application Priority Data

Dec. 26, 2000 (JP) ........................................ 2000-395136

(51) Int. Cl.[7] .............................................. G06F 12/00
(52) U.S. Cl. .......................... 711/154; 711/167; 711/111
(58) Field of Search ................................ 711/154, 165, 711/162; 731/714

(56) References Cited

U.S. PATENT DOCUMENTS

| | | | | |
|---|---|---|---|---|
| 6,253,300 B1 | * | 6/2001 | Lawrence et al. | 711/173 |
| 6,282,039 B1 | * | 8/2001 | Bartlett | 360/48 |
| 6,397,311 B1 | * | 5/2002 | Capps | 711/165 |
| 6,556,769 B1 | * | 4/2003 | Akahane et al. | 386/46 |
| 6,625,094 B1 | * | 9/2003 | Park et al. | 369/47.14 |
| 6,735,678 B2 | * | 5/2004 | Noble et al. | 711/165 |
| 2002/0059539 A1 | * | 5/2002 | Anderson | 714/6 |
| 2002/0131758 A1 | * | 9/2002 | Austin | 386/46 |

FOREIGN PATENT DOCUMENTS

| | | |
|---|---|---|
| JP | 2-64830 | 3/1990 |
| JP | 4-335784 | 11/1992 |
| JP | 7-249261 | 9/1995 |
| JP | 10-341411 | 12/1998 |
| JP | 2001-36841 | 2/2001 |
| JP | 2001-291366 | 10/2001 |

OTHER PUBLICATIONS

The Logical Structure, Organization, and Management of Hard Disk Drives□□Gibson, Steve. Copyright 1989.□□Retrieved Nov. 30, 2004 from http://www.textfiles.com/computers/disks3.*
FAT Filenames□□Verstak, Alex. Mar. 10, 1998□□Retrieved Dec. 2, 2004 from http://averstak.tripod.com/fatdox/names.htm.*
An Introduction to DOS FAT Volume and File Structure□□Kampe, Mark□□Retrieved Dec. 2, 2004 from http://www.seas.ucla.edu/classes/mkampe/cs111.fq04/docs/dos.html.*
How Computers Work, 6th edition White, Ron Copyright 2002. p. 157.*
Universal Disk Format Specification, Mar. 2000, Optical Storage Technology Association.*

* cited by examiner

*Primary Examiner*—Brian R. Reugh
(74) *Attorney, Agent, or Firm*—Frommer Lawrence & Haug LLP; William S. Frommer; Thomas F. Presson

(57) ABSTRACT

A system and method for recording and storing data such that in the event of a fault condition, a management file can be regenerated. This is accomplished by writing first management files, for managing time-sequential data, onto a recording medium. A second management file, which indicates recording positions and sizes on the recording medium, is also written onto the recording medium. A third management file, which manages all of the time-sequential data, is also written onto the recording medium. In the event of a fault condition, which may compromise the integrity of the third management file, a duplicate third management file can be generated based on the second management file.

17 Claims, 11 Drawing Sheets

US 6,954,830 B2

DATA RECORDING METHOD, DATA RECORDER, AND RECORDING MEDIUM

TECHNICAL FIELD

The invention relates to a data recording method of recording a series of data so that time can be managed and, more particularly, a data recording method which can form a spare management file of a management file for managing the series of data. Further, the invention relates to a data recording apparatus using such a data recording method and a recording medium on which data has been recorded by the data recording method.

BACKGROUND ART

An apparatus such as a video camera or the like for recording and reproducing a motion image has been researched and developed. Since a motion image is regarded as a set of still images which were time-sequentially reproduced, it is demanded that a motion image recording and reproducing apparatus time-sequentially records and reproduces a series of still image data.

As software for handling such a series of data (called "Movie") which changes time-sequentially, for example, there are "QuickTime" (trademark), "Video for Windows" (trademark), and the like.

According to QuickTime, various data is managed along a time base. An application can handle multimedia data by using QuickTime independent of a data type, a data format, a compression format, and a hardware construction. The QuickTime itself has an easily-expandable structure and can cope with new data type, data format, compression format, and accelerator hardware. As mentioned above, since Quick-Time does not depend on a platform, but corresponds to various recording formats, and has expandability, it is widely used. QuickTime has been disclosed in, for example, "INSIDE MACINTOSH: QuickTime (Japanese Edition) (Addison Wesley)" or the like. An outline of QuickTime will be described hereinbelow.

A fundamental data unit of a QuickTime movie resource is called "atom". Each atom includes a size and type information together with the data.

FIG. 11 is a diagram showing an example of a QuickTime movie file.

The QuickTime movie file is constructed mainly by two portions, a movie atom 501 and a media data atom 502.

The movie atom 501 is a portion for storing information necessary for reproducing the file and information necessary for referring to real data. The media data atom 502 is a portion for storing the real data such as video, audio, or the like.

The movie atom includes a size, a type, a movie header atom, a movie clipping atom, a track list, and a user definition data atom. FIG. 11 shows a case where the movie atom 501 is constructed by a movie header atom 511 and two track atoms (a track (Video) atom 512 and a track (Audio) atom 513).

Information such as a time scale, a length, and the like regarding the whole movie is included in the movie header atom.

The track atom is prepared every kind of data and includes a size, a type, a track header atom, a track clipping atom, a tack matte atom, an edit atom, a media atom, and a user definition data atom. FIG. 11 shows a case where the movie atom is constructed by a track header atom 521 and a media atom 522.

In the track header atom, time information, space information, sound volume information, and the like are described and characteristics of tracks in the movie are specified.

In the media atom, data of the movie track is described. In the media atom, information for specifying components for interpreting the media data is also described and data information of the media is also specified. The media atom includes a size, a type, a media header atom, a media handler atom, a media information atom, and a user definition data atom. FIG. 11 shows a case where the media atom is constructed by a media header atom 531, a media handler atom 532, and a media information atom 533.

In the media header atom, information regarding the whole media is described and characteristics of the media as a storing location corresponding to the movie track are specified. The media handler atom designates components which should interpret data stored in the media. The media information atom stores information peculiar to a handler for the media data constructing the tracks. The media handler atom performs mapping from media time to the media data by using such information. FIG. 11 shows a case where the media information atom 533 is constructed by: a media information header atom 541; a data handler atom 542; a sample table 543; and a data information atom 544.

In the media information header atom, the information regarding the media is described. In the data handler atom, information regarding handling of the media data is described and information for designating a data handler component which provides means for accessing the media data is included. In the data information atom, information regarding the data is described. The sample table atom includes information necessary for converting the media time into a sample number indicative of a sampling position. FIG. 11 shows a case where the sample table atom 543 is constructed by: a sample description atom 551; a time-to-sample atom 552; a sample size atom 553; a sample-to-chunk atom 554; a chunk offset atom 555; and a sync sample atom 556.

Information necessary for decoding samples in the media is stored in the sample description atom. The media can have one or a plurality of sample description atoms in accordance with the kind of compression type which is used in this media. The sample chunk atom identifies a sample description corresponding to each sample in the media by referring to the table in the sample description atom.

In the time-to-sample atom, a relation between the sample and the time base, that is, a relation showing that the data of how many seconds has been recorded is described.

In the sample size atom, a size of sample is described.

In the sample to chunk atom, a relation between the sample and a chunk is described and the sampling position in the media is identified on the basis of information of a head chunk, the number of samples per chunk, and a sample description-ID.

In the chunk offset atom, a start bit position of the chunk in the movie data is described and a position of each chunk in a data stream is specified.

In the sync sample atom, information regarding a synchronization is described and a key frame in the media is designated. The key frame is a frame of a self intensional type which does not depend on a preceding frame.

In QuickTime, a minimum unit of the data is handled as a sample and the chunk is defined as a set of samples. From a viewpoint of improving accessing performance upon recording and reproduction, it is preferable that the samples in the chunk are continuously stored.

Since internal structures of the track (Video) atom 512 and track (audio) atom 513 are the same, they are omitted in FIG. 11.

In FIG. 11, for example, each of audio data encoded by a predetermined compression encoding system and image data encoded by a predetermined compression encoding system is stored into the movie data on a unit basis of a chunk comprising a predetermined number of samples. It is not always necessary to compression-encode the data but linear data can be also stored.

Each track in the movie atom and the data stored in the movie data have been made to correspond to each other.

In such a construction, QuickTime accesses the media data corresponding to specific time by giving a command to a proper media handler atom. For example, in case of searching samples, the search is executed by the following procedure.

First, the media handler atom determines the time based on a time scale of the relevant media.

Second, the media handler atom examines contents in the time-to-sample atom and determines the number of the sample in which the data corresponding to the designated time has been stored.

Third, the media handler atom examines contents in the sample chunk atom and determines the chunk in which the relevant samples have been stored.

Fourth, the media handler atom obtains an offset from the chunk offset atom to the chunk.

Fifth, an offset in the chunk is obtained from the sample size atom.

The media handler atom can identify the position and size of the sample corresponding to the given media time. QuickTime reproduces the real data in accordance with the time scale.

There is, however, a case where although the real data is recorded and reproduced onto/from a recording medium together with the management files which are time-sequentially handled, the management file is destroyed due to scratches formed on the recording medium, so that the data cannot be reproduced.

DISCLOSURE OF INVENTION

It is, therefore, an object of the invention to provide a data recording method which can reproduce a recorded motion image even if a management file is destroyed.

It is another object of the invention to provide a data recording apparatus for using the data recording method and a recording medium on which data has been recorded by the data recording method.

According to the invention, there is provided a data recording method comprising: a first step of generating first management files for managing time-sequential data at predetermined time intervals and sequentially writing the first management files onto a recording medium; a second step of generating a second management file having recording positions and sizes on the recording medium with respect to all of the first management files and writing the second management file onto the recording medium; a third step of generating a third management file for managing all of the time-sequential data and writing the third management file onto the recording medium; and a fourth step of newly generating a third management file again on the basis of the second management file in the case where the third management file does not exist or cannot be read out.

Such a data recording method can further has a fifth step of writing the third management file which was newly generated again onto the recording medium.

In such a data recording method, the second step can further include a step of dividing the second management file into a plurality of files each having a predetermined size. File names of the plurality of divided second management files can include continuous numbers. The fourth step can also include a step of reading the second management files in order from the recording medium in accordance with the continuous numbers.

In such a data recording method, each file name of the file of the time-sequential data, the second management file, and the third management file can be also constructed by a portion which is common to all of the files and a different portion. For example, an extension can be also allocated to the different portion.

In such a data recording method, the predetermined time interval can be also set to a plurality of time intervals by, for example, changing the predetermined time interval in accordance with the elapsed time from the start of the generation of the time-sequential data. As such a change, for example, the predetermined time interval can be also increased in accordance with the elapsed time.

According to the invention, there is provided a data recording apparatus comprising: first means for generating first management files for managing time-sequential data at predetermined time intervals and sequentially writing the first management files onto a recording medium; second means for generating a second management file having recording positions and sizes on the recording medium with respect to all of the first management files and writing the second management file onto the recording medium; third means for generating a third management file for managing all of the time-sequential data and writing the third management file onto the recording medium; and fourth means for newly generating a third management file again on the basis of the second management file in the case where the third management file does not exist or cannot be read out.

Such a data recording apparatus can further has fifth means for writing the third management file which was newly generated again onto the recording medium.

In such a data recording apparatus, the second means can further include means for dividing the second management file into a plurality of files each having a predetermined size.

In such a data recording apparatus, each file name of the file of the time-sequential data, the second management file, and the third management file can be also constructed by a portion which is common to all of the files and a different portion.

In such a data recording apparatus, the predetermined time interval can be also set to a plurality of time intervals by, for example, changing the predetermined time interval in accordance with the elapsed time from the start of the generation of the time-sequential data. As such a change, for example, the predetermined time interval can be also increased in accordance with the elapsed time.

According to the invention, there is provided a computer-readable recording medium on which a plurality of first management files each for managing a part of time-sequential data, a second management file having recording positions and sizes with respect to all of the first management files, and a third management file for managing all of the time-sequential data have been written.

According to the data recording method, data recording apparatus, and recording medium of the invention, the second management file is generated as a spare management file. Therefore, even if a fault such as scratches or the like occurs on the recording medium during the recording or after completion of the recording and the third management file as a normal management file cannot be read out, the third management file can be generated again from the second management file. Therefore, according to the invention, reliability of the recording medium can be improved and the time-sequential data can be reproduced more certainly than the conventional case.

BEST MODE FOR CARRYING OUT THE INVENTION

An embodiment of the invention will be described hereinbelow.
(Outline of Processes of an Embodiment)

According to the embodiment, a video signal and an audio signal are encoded by a predetermined compression and decompression system, real data encoded in a format which can be handled by an application for managing a series of time-sequential real data is managed, and the real data and management data are recorded in a predetermined format onto the recording medium. According to the invention, the video signal and the audio signal are reproduced by inversely processing the recorded real data with reference to the management data. One of features of the embodiment relates to a managing method of the encoded real data.

In the embodiment, the MPEG (Moving Picture Coding Experts Group) is used as a predetermined compression and decompression system, QuickTime is used as an application, and the UDF (Universal Disk Format Specification) is used as a format.

According to the MPEG, fundamentally, compression and decompression are executed by using a Discrete Cosine Transform (DCT), a motion compensation inter-frame prediction and variable length encoding, and in order to make a random access easy, a GOP (group of pictures) structure in which an I picture (intra-coded picture), a P picture (predictive-coded picture), and a B picture (bidirectionally predictive-coded picture) have been combined is used.

The UDF is a standard regarding a high density optical disk. The UDF is a hierarchical file system, a subdirectory is referred to from information stored in a root directory, and another subdirectory or a substantial file is further referred to from information stored in the subdirectory.

The UDF will be described more specifically. In a file entry (FE) of the root directory, for example, its position is recorded in volume information which is written subsequently to a lead-in area in a DVD-RAM. The file entry comprises: a root directory; a subdirectory; and an allocation descriptor (AD) as information of an address and a length of the file. A recording area on the optical disk is accessed by setting a sector to a minimum unit.

The AD in the FE of the root directory indicates a logic address and a length of the root directory as a substance. The substance of the root directory includes one or a plurality of file identifier descriptors FIDs. In the FID, an FE of the subdirectory existing under the root directory and an FE of the file are described. Substances of the subdirectory and the file are referred to by those FEs. The substance of the subdirectory includes one or a plurality of FIDs. In the FID of the subdirectory, the FEs of the subdirectory and the file existing under the relevant subdirectory are described. That is, in the UDF, the subroot directory and the file are accessed in order of the FID, FE, and substance by using the FID and FE as pointers.

(Construction of the Embodiment)

Figure 1:
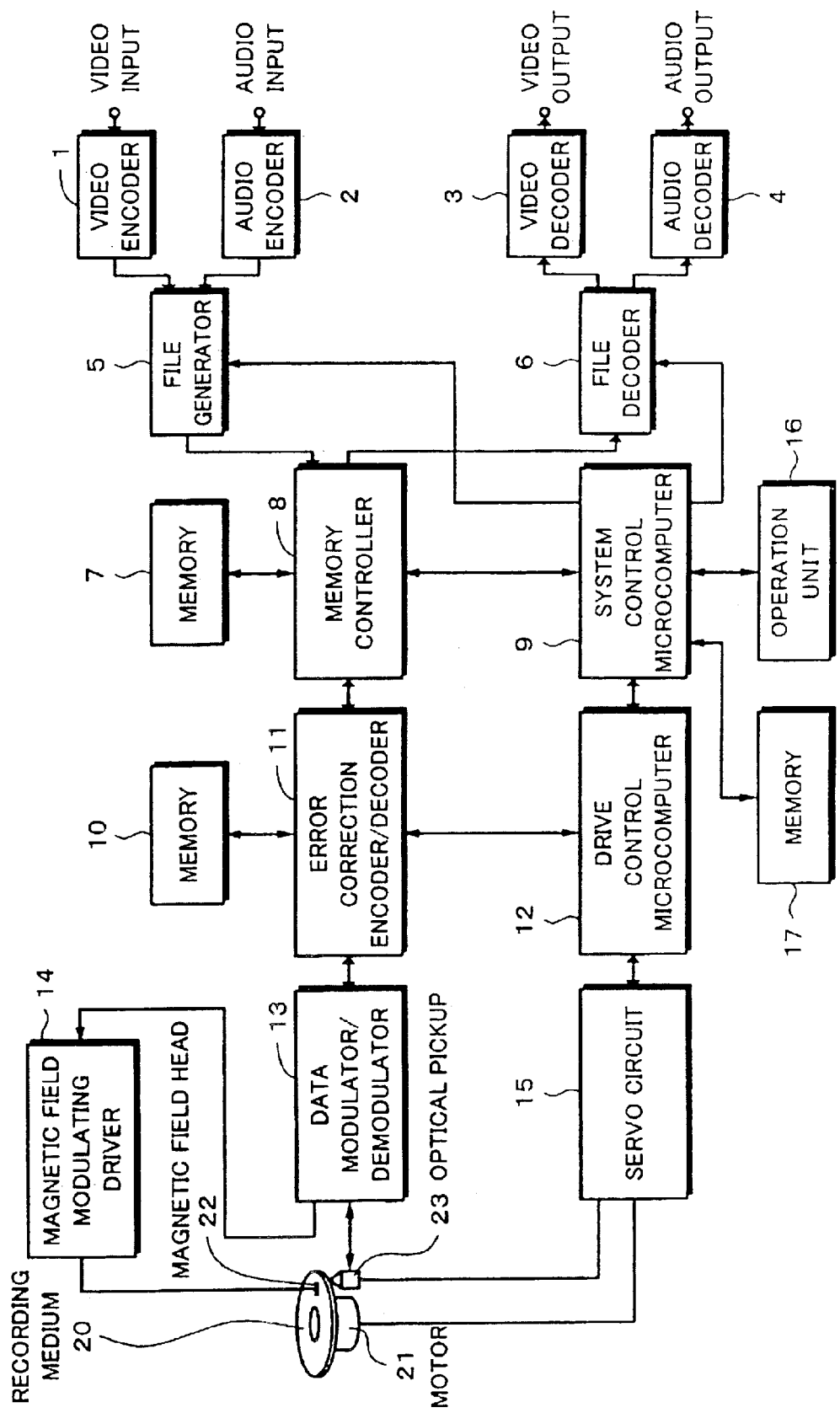
FIG. 1 is a block diagram showing a construction of a digital recording and reproducing apparatus according to an embodiment.

FIG. 1 is a block diagram showing a construction of a digital recording and reproducing apparatus according to an embodiment.

In FIG. 1, the digital recording and reproducing apparatus comprises: a video encoder 1; an audio encoder 2; a video decoder 3; an audio decoder 4; a file generator 5; a file decoder 6; memories 7, 10, and 17; a memory controller 8; a system control microcomputer 9; an error correction encoder/decoder 11; a drive control microcomputer 12; a data modulator/demodulator 13; a magnetic field modulating driver 14; a servo circuit 15; an operation unit 16; a motor 21; a magnetic field head 22; and an optical pickup 23.

The video signal is supplied from a video input terminal to the video encoder 1 and compression encoded. The audio signal is supplied from an audio input terminal to the audio encoder 2 and compression encoded. In the embodiment, the MPEG is used for the compression encoding. Each output of the video encoder 1 and audio encoder 2 is called an elementary stream.

For example, in case of the MPEG, the video encoder 1 comprises: an image re-arranging unit; a local decoding unit; a subtractor; a DCT unit; a quantizing unit; a variable length encoding unit; and a buffer memory.

The video signal supplied to the video encoder 1 is inputted to the DCT unit via the image re-arranging unit and subtracting unit and DCT transformed. The image re-arranging unit re-arranges the order of pictures to an order adapted to an encoding process. That is, the pictures are re-arranged to the order suitable for encoding the I picture and P picture first and, thereafter, encoding the B picture. An output of the DCT unit is inputted to the quantizing unit and quantized by a predetermined number of bits. An output of the quantizing unit is inputted to the variable length encoding unit and the local decoding unit. The variable length encoding unit variable length encodes the input by a predetermined encoding method, for example, the Huffman code and outputs encoded data to the buffer memory. The buffer memory outputs the encoded data at a predetermined rate as an output of the video encoder 1.

The local decoding unit comprises: an inverse quantizing unit; an inverse DCT unit; an adding unit; a frame memory; and a motion compensating unit. The signal inputted from the quantizing unit to the local decoding unit is inversely quantized by the inverse quantizing unit, inversely DCT transformed by the inverse DCT unit, and decoded. The decoded video input is added to an output of the motion compensating unit by the adding unit and inputted to the frame memory. An output of the frame memory is inputted to the motion compensating unit. The motion compensating unit executes a forward direction prediction, a backward direction prediction, and a bidirectional prediction. The output of the motion compensating unit is inputted to the adding unit and the subtracting unit mentioned above. The subtracting unit executes a subtraction between an output of the image re-arranging unit and the output of the motion compensating unit, thereby forming a predictive error between the video signal and the decoding video signal which was decoded by the local decoding unit. In case of the intra-frame encoding (I picture), the subtracting unit does not execute the subtracting process but the data merely passes.

The audio encoder 2 comprises, for example: a subband encoding unit; an adaptive quantization bit allocating unit; and the like.

The output of the video encoder 1 and the output of the audio encoder 2 are supplied to the file generator 5. The file generator 5 converts data structures of the video elementary stream and audio elementary stream so as to have a file structure which can be handled by computer software which can synchronously reproduce a motion image, an audio sound, a text, and the like without using a specific hardware construction. For example, such software is QuickTime mentioned above. The file generator 5 multiplexes the encoded video data and the encoded audio data. The file generator 5 is controlled by the system control microcomputer 9.

The QuickTime movie files as an output of the file generator 5 are sequentially written into the memory 7 via the memory controller 8. When the data writing onto a recording medium 20 is requested from the system control microcomputer, the memory controller 8 reads out the QuickTime movie files from the memory 7.

A transfer rate of the QuickTime movie encoding is set to a transfer rate lower than that of write data to the recording medium 20, for example, ½. Therefore, although the QuickTime movie files are continuously written into the memory 7, the read-out of the QuickTime movie files from the memory 7 is intermittently performed while being monitored by the system control microcomputer 9 so that the memory 7 does not overflow or underflow.

The QuickTime movie files read out from the memory 7 are supplied from the memory controller 8 to the error correction encoder/decoder 11. The error correction encoder/decoder 11 once writes the QuickTime movie files into the memory 10 and forms redundancy data of an interleaved and error correction code. The error correction encoder/decoder 11 reads out the data to which the redundancy data has been added from the memory 10 and supplies it to the data modulator/demodulator 13.

When digital data is recorded onto the recording medium 20, the data modulator/demodulator 13 modulates the data so as to enable clocks to be easily extracted upon reproduction and so as not to cause a problem such as an inter-symbol interference or the like. For example, a (1, 7) RLL (run length limited) code, a trellis code, or the like can be used.

An output of the data modulator/demodulator 13 is supplied to the magnetic field modulating driver 14 and optical pickup 23. The magnetic field modulating driver 14 drives magnetic field head 22 in accordance with the input signal and applies a magnetic field to the recording medium 20. The optical pickup 23 irradiates a laser beam for recording onto the recording medium 20 in accordance with the input signal. In this manner, the data is recorded onto the recording medium 20.

The recording medium 20 is a rewritable optical disk, for example, a magneto-optical disk (MO), a phase change type disk, or the like.

In the embodiment, it is an MO of a small diameter. The recording medium 20 is rotated by the motor 21 at a constant linear velocity (CLV), a constant angular velocity (CAV), or a zone CLV (ZCLV).

The drive control microcomputer 12 generates a signal to the servo circuit 15 in response to a request of the system control microcomputer 9. The servo circuit 15 controls the motor 21 and optical pickup 23 in accordance with this output, thereby controlling the whole drive. For example, the servo circuit 15 executes a moving servo in the radial direction of the recording medium 20, a tracking servo, and a focusing servo to the optical pickup 23 and controls the rotational speed of the motor 21.

The operation unit 16 for the user to input a predetermined instruction and the memory 17 into which management data is written are connected to the system control microcomputer 9.

Upon reproduction, the optical pickup 23 irradiates a laser beam having a power for reproduction onto the recording medium 20. A photodetector in the optical pickup receives the reflected light, thereby obtaining a reproduction signal. In this case, the drive control microcomputer 12 detects a tracking error and a focusing error from an output signal of the photodetector in the optical pickup 23 and controls the optical pickup 23 by the servo circuit 15 in a manner such that the reading laser beam is located on the track and focused thereon. Further, the drive control microcomputer 12 also controls the movement in the radial direction of the optical pickup so as to reproduce the data at a desired position on the recording medium 20. In a manner similar to the case upon recording, a signal is sent to the drive control microcomputer 12 by the system control microcomputer 9 and the desired position is determined.

A reproduction signal of the optical pickup 23 is supplied to the data modulator/demodulator 13 and demodulated. The demodulated data is supplied to the error correction encoder/decoder 11. The reproduction data is once stored into the memory 10, deinterleaved, and error corrected. The QuickTime movie files after completion of the error correction are stored into the memory 7 via the memory controller 8.

The QuickTime movie files stored in the memory 7 are outputted to the file decoder 6 in accordance with a request from the system control microcomputer 9. To continuously reproduce the video signal and audio signal, the system control microcomputer 9 monitors an amount of data of the reproduction signal from the recording medium 20 which is stored into the memory 7 and an amount of data which is read out from the memory 7 and supplied to the file decoder 6, thereby controlling the memory controller 8 and the drive control microcomputer 12 in a manner such that the memory 7 does not overflow or underflow. In this manner, the system control microcomputer 9 intermittently reads out the data from the recording medium 20.

Under the control of the system control microcomputer 9, the file decoder 6 separates the QuickTime movie file into the video elementary stream and the audio elementary file. The video elementary stream is supplied to the video decoder 3, subjected to a decoding of the compression encoding, and outputted as a video output from a video output terminal. The audio elementary stream is supplied to the audio decoder, subjected to a decoding of the compression encoding, and outputted as an audio output from an audio output terminal. The file decoder 6 outputs the video elementary stream and the audio elementary file so that they are synchronized.

For example, in case of the MPEG, the video decoder 3 comprises: a buffer memory; a variable length code decoding unit; an inverse quantizing unit; an inverse DCT unit; an adding unit; a frame memory; a motion compensating unit; and an image re-arranging unit. Although the adding unit adds an output of the inverse quantizing unit and an output of the motion compensating unit, in case of decoding the I picture, they are not added. An output of the adding unit is re-arranged to the order of the original image by the image re-arranging unit.

(Operation and Effects of the Embodiment)

The operation of the embodiment will now be described.

First, the case of recording the image data will be explained.

In the embodiment, it is assumed that the digital recording and reproducing apparatus is provided in a digital recording and reproducing apparatus of a camera integrated type. An image photographed by a video camera is supplied as a video signal to the video signal and an audio sound collected by a microphone is supplied as an audio signal to the audio signal.

Figure 2:
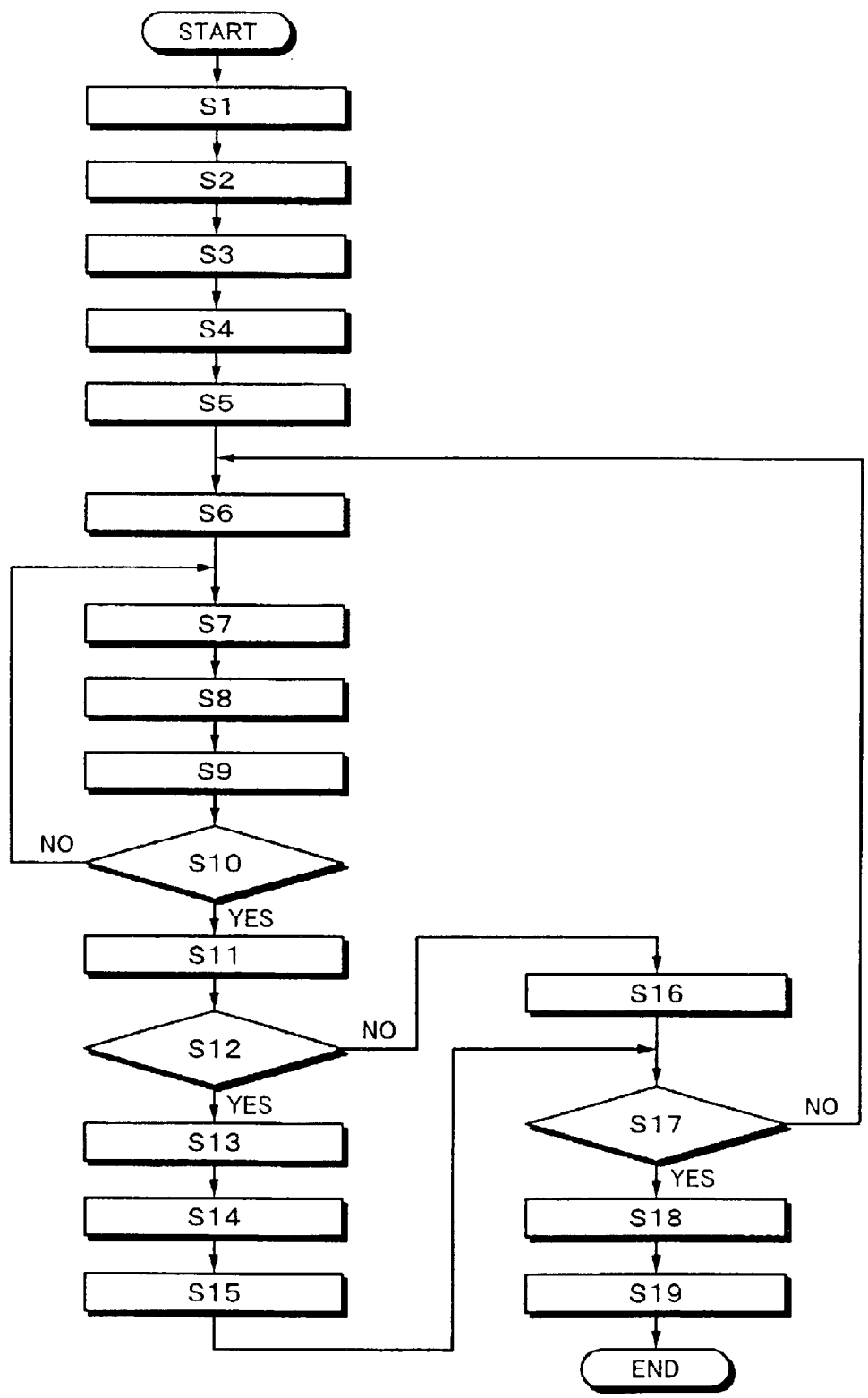
FIG. 2 is a diagram showing a flowchart in case of recording a QuickTime movie file onto a recording medium 20.

FIG. 2 is a diagram showing a flowchart in the case where the QuickTime movie files are recorded onto the recording medium 20.

Figure 3:
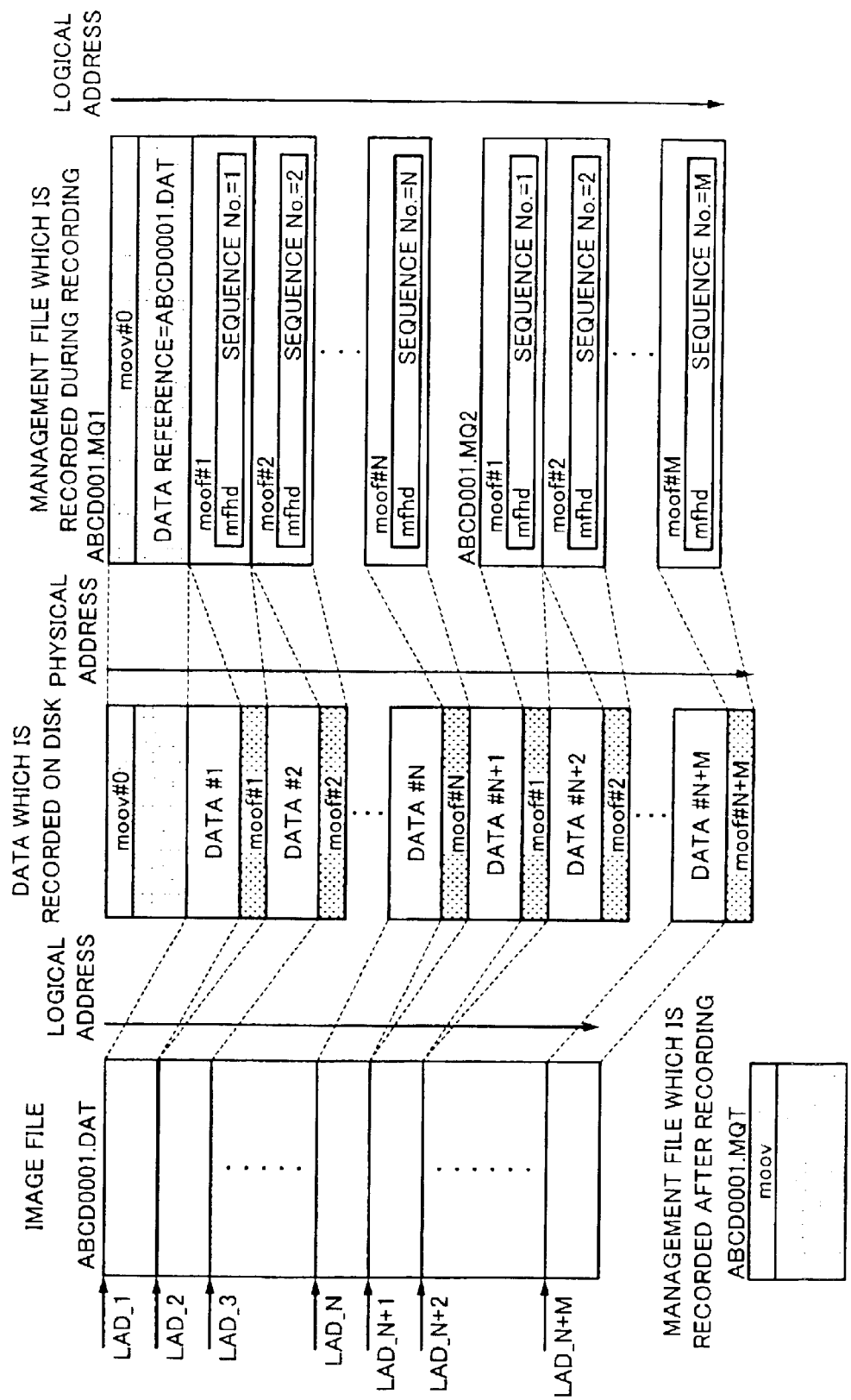
FIG. 3 is a diagram (part 1) showing relations among an image file, data which is recorded onto the recording medium, a partial management file which is recorded during the recording, and a normal management file which is recorded after completion of the recording.

FIG. 3 is a diagram showing relations among the image file, the data which is recorded onto the recording medium, a partial management file which is recorded during the recording, and a normal management file which is recorded after completion of the recording.

In FIG. 3, a center diagram shows the data which is recorded onto the recording medium 20, an upper left diagram shows the image file. A lower left diagram shows the normal management file which is recorded onto the recording medium 20 after completion of the recording, and a right diagram shows the partial management file which is recorded during the recording.

Figure 4:
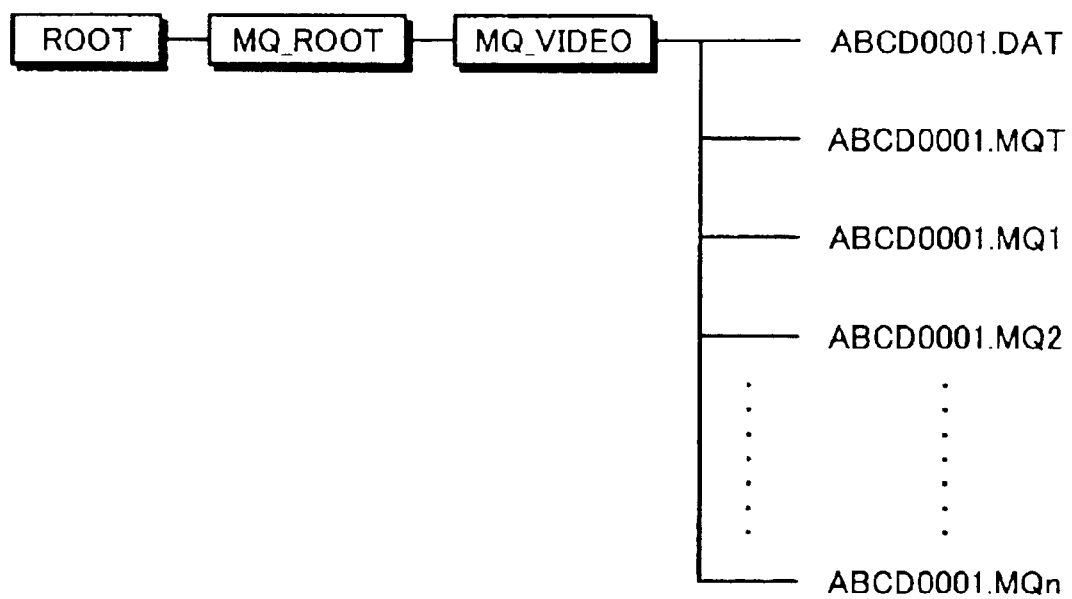
FIG. 4 is a diagram showing a tree structure of files in the embodiment.

FIG. 4 is a diagram showing a tree structure of files in the embodiment.

In FIG. 4, an MQ_ROOT directory as a subdirectory exists under a root directory, an MQ_VIDEO directory as a subdirectory exists under the MQ_ROOT directory, and ABCD0001.DAT, ABCD0001MQT, ABCD0001.MQ1, ABCD0001.MQ2, . . . , ABCD0001.MQn as files as substances exist under the MQ_VIDEO directory.

ABCD0001.MQ2, . . . , ABCD0001.MQn are formed as necessary as will be explained hereinlater.

Figure 5:
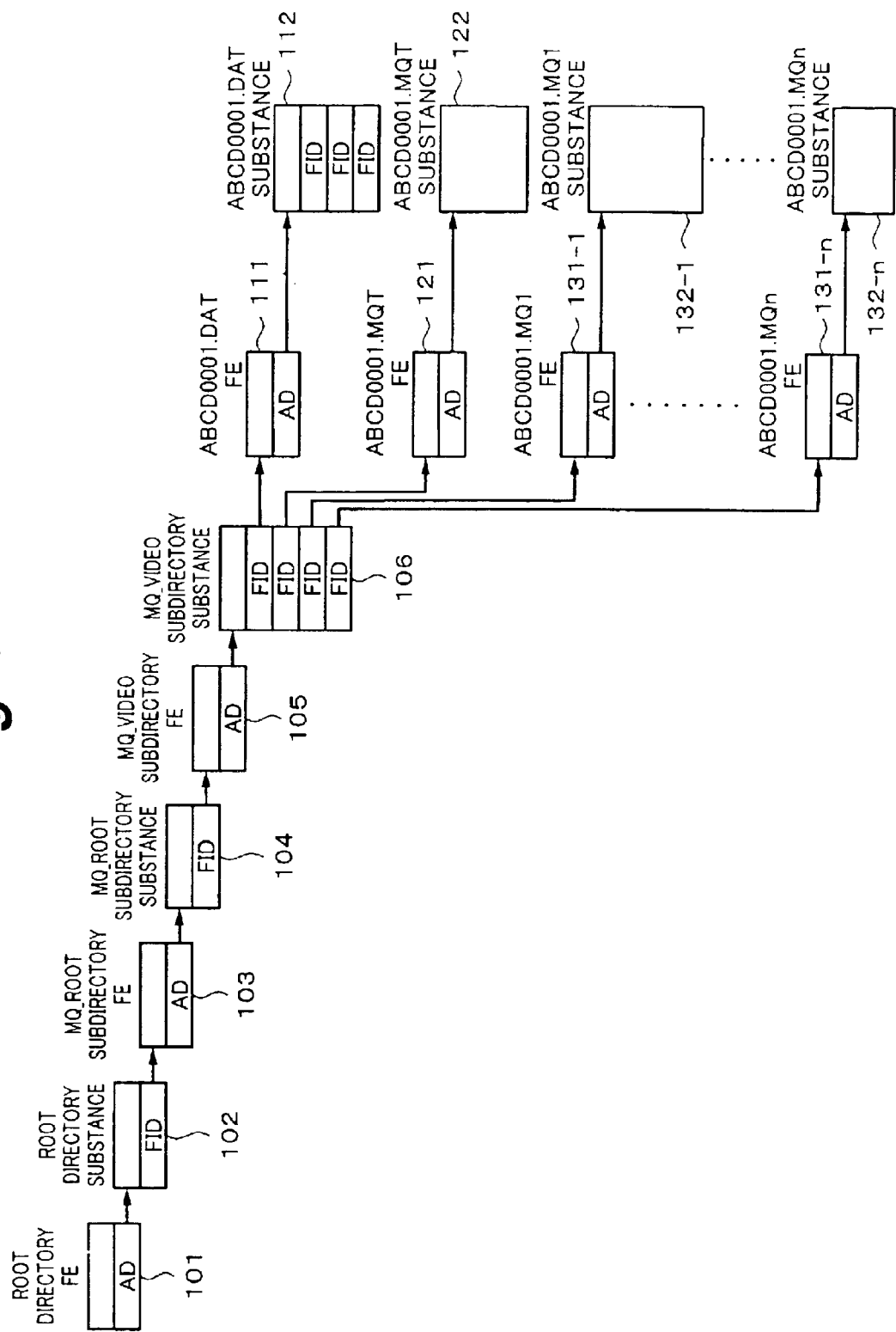
FIG. 5 is a diagram showing a UDF of the file in the embodiment.

FIG. 5 is a diagram showing a UDF of the file in the embodiment.

In FIGS. 2 to 5, when the user instructs the start of photographing from the operation unit 16, the system control microcomputer 9 assures areas for storing an FE 111 of the image file, an FE 121 of the normal management file, and an FE 131-1 of the first spare management file onto the memory 17 (S1).

Each file name is set as follows. For example, the image file is assumed to be ABCD0001.DAT, the normal management file is assumed to be ABCD0001.MQT, and the nth spare management file is assumed to be ABCD001.MQn. As mentioned above, each of the image file, the normal management file, and the spare management file is constructed by a common portion (in the embodiment, "ABCD0001") and a different portion in order to identify each file. As a portion to identify each file, in the embodiment, an extension in a 8.3 file name format is used. An extension DAT shows that the relevant file is the image file, an extension MQT shows that the relevant file is the normal management file, and an extension MQn shows that the relevant file is the nth spare management file. For example, ABCD0001.MQ1 is the first spare management file which is formed first, and ABCD0002.MQ2 is the second spare management file which is formed second.

Subsequently, the system control microcomputer 9 assures areas for storing a sample table to form the normal management file ABCD0001.MQT112 and a sample table to form the partial management file as management files of the QuickTime movie files onto the memory 17 (S2).

As shown in Table 1, the sample table comprises items of a sample description atom, a time-to-sample atom, a sample size atom, a sample to chunk atom, a chunk offset atom, and a sync sample atom every sample.

TABLE 1

Example of sample table

| | description | time | size | chunk | offset | sync |
|---|---|---|---|---|---|---|
| sample1 | M | T1 | L2 | S1 | ADR1 | Sc1 |
| sample2 | M | T3 | L5 | S2 | ADR2 | Sc3 |
| sample3 | M | T7 | L1 | S3 | ADR3 | Sc4 |
| sample4 | M | T1 | L3 | S4 | ADR4 | Sc3 |
| . | . | . | . | . | . | . |
| . | . | . | . | . | . | . |
| Samplen | Mn | Tn | Ln | Sn | ADRn | Scn |

Subsequently, the system control microcomputer 9 determines a recording position on the recording medium 20 (S3).

Subsequently, the system control microcomputer 9 forms an initial moov atom (moov #0) and records it onto the recording medium 20 (S4).

A construction of the initial moov atom will now be described.

Figure 6:
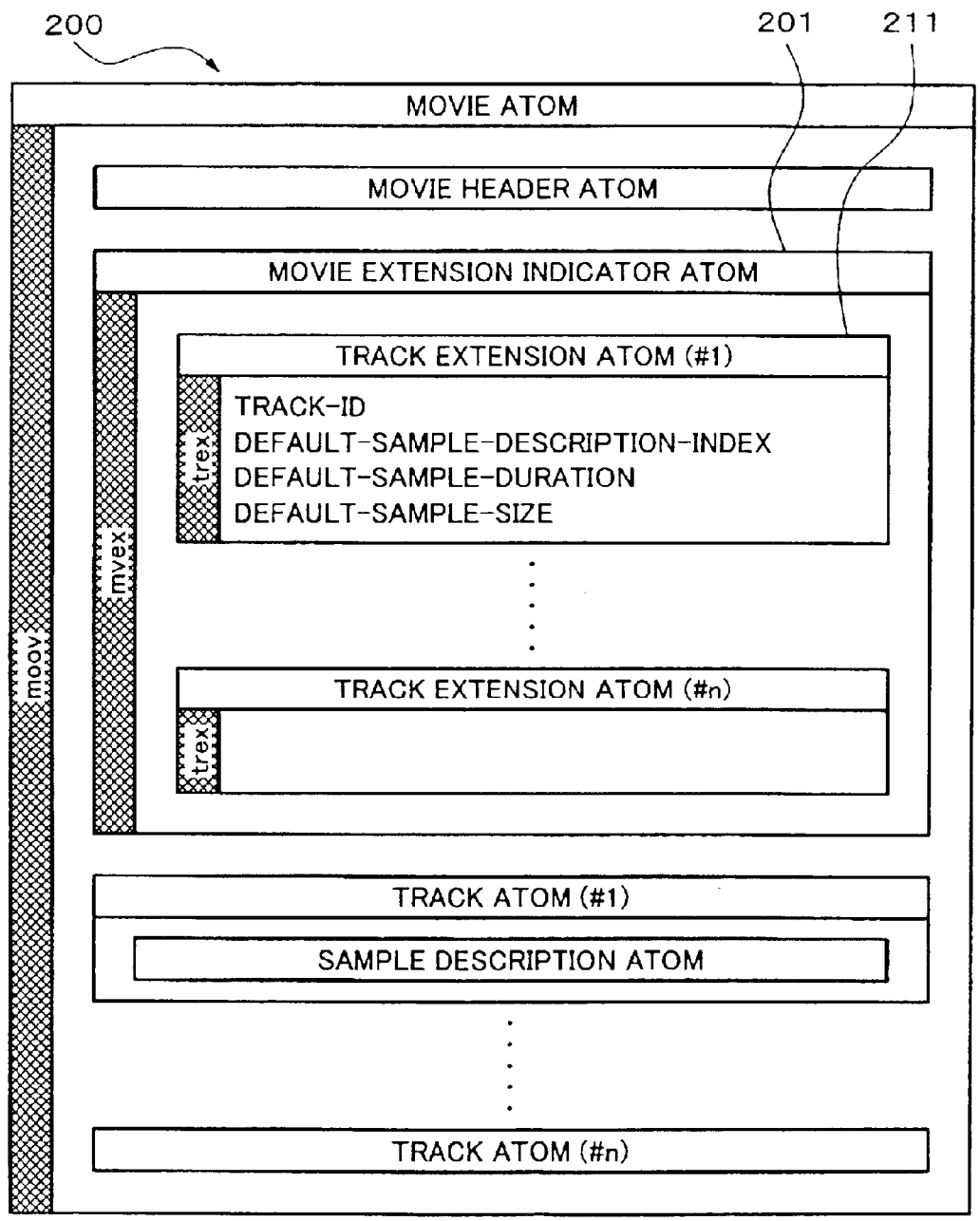
FIG. 6 is a diagram showing a construction of an initial moov atom.

FIG. 6 is a diagram showing the construction of the initial moov atom.

Figure 11:
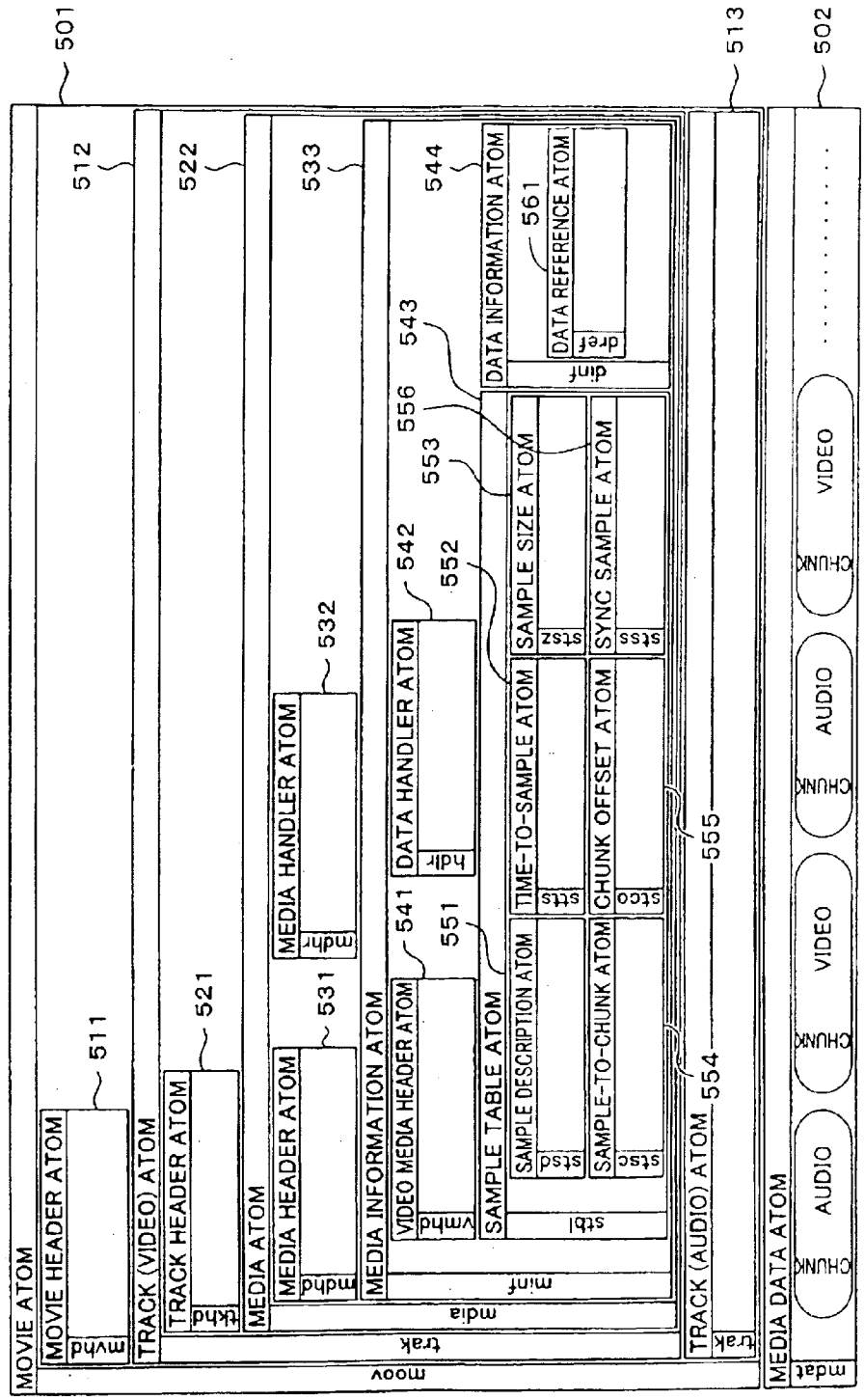
FIG. 11 is a diagram showing an example of the Quick-Time movie file.

In FIG. 6, an initial moov atom 200 has a structure in which a movie extension indicator atom 201 has been further added to the movie atom of the QuickTime movie file shown in FIG. 11. In the initial moov atom 200, the number of tracks, a compression/decompression system, time per sample, and a size of one sample are described as defaults with respect to the samples of the data which is recorded from now on.

The movie extension indicator atom 201 comprises a track extension atom 211. The number of track extension atoms 211 is the same as that of the tracks of data#1 shown in FIG. 3. The track extension atom 211 comprises a track-ID, a default-sample-description-index, a default-sample-duration, and a default-sample-size.

The track-ID is a track number. For example, in the track extension atom (#1), the track-ID is equal to "1", and in the track extension atom (#2), the track-ID is equal to "2".

The default-sample-description-index has the same contents as those written in the sample description atom and the compression/decompression system is described here. In the embodiment, a code indicative of the MPEG is described.

Time which is necessary for decoding one sample and reproducing it is described in the default-sample-duration.

A size of one sample is described in the default-sample-size.

Subsequently, the system control microcomputer 9 enters the recording position and the size of the initial moov atom 200 into the FE 131-1 of the spare management file ABCD0001.MQ1 (S5).

Subsequently, the system control microcomputer 9 decides the recording position and the data amount (S6). The data amount is determined in accordance with an initial value of the recording interval, for example, an interval of 3 seconds.

Subsequently, the system control microcomputer 9 fetches the video signal and the audio signal from each input, forms image data (data) of one frame, and records the image data onto the recording medium 20. The system control microcomputer 9 increases a recording time counter in accordance with a time scale of the image data (data) (S7).

Subsequently, the system control microcomputer 9 forms each item of the sample table with respect to the samples regarding the image data recorded in S7, and adds them into a sample table for the normal management file ABCD0001.MQT and a sample table for the partial management file moof which exist on the memory 17 (S8).

Subsequently, the system control microcomputer 9 decides a recording interval (DT) of the partial management file moof by referring to a predetermined table on the basis of the recording time counter (S9).

For example, a table shown in the relation (first example) between the recording time and the recording interval (DT) is used as a predetermined table.

TABLE 2

Relation between the elapsed recording time and the recording interval of moof (the 1st example)

| Elapsed recording time (min) | Recording interval of moof (sec) |
|---|---|
| 0~<1 | 3 |
| 1~<10 | 10 |
| 10~<30 | 20 |
| 30~<60 | 30 |
| 60≦~ | 60 |

As shown in Table 2, by increasing the recording interval of the partial management file moof in accordance with the recording time, a ratio at which the partial management file moof as a management file occupies a capacity of the recording medium 20 as compared with the image data (data) as real data can be reduced more than that in the case where the partial management file moof is recorded at regular intervals.

If the recording interval of the partial management file moof is set to be larger than the photographing/recording time, when a fault occurs in the recording medium 20 or the like during the photographing/recording time, all of the recorded video images cannot be reproduced. However, by controlling the recording interval of the partial management file moof as mentioned above, a plurality of partial management files are formed even during the photographing/recording of a short time, so that the record until the timing before the occurrence of the fault can be reproduced.

Or, in order to further reduce, a table showing a relation (second example) between the recording time and the recording interval (DT) can be also used as a predetermined table.

TABLE 3

Relation between the elapsed recording time and the recording interval of moof (the 2nd example)

| Elapsed recording time (min) | Recording interval of moof (sec) |
|---|---|
| 0~<1 | 3 |
| 1~<10 | 10 |
| 10~<30 | 30 |
| 30~<60 | 60 |
| 60≦~ | 180 |

As shown in the table showing a relation (third example) between the recording time and the recording interval (DT), the relation between the recording time and the recording interval (DT) can be also repeated after the elapse of the recording time of the predetermined time.

TABLE 4

Relation between the elapsed recording time and the recording interval of moof (the 3rd example)

| Elapsed recording time (min) | Recording interval of moof (sec) |
|---|---|
| 0~<1 | 3 |
| 1~<10 | 10 |
| 10~<30 | 20 |
| 30~<60 | 30 |
| 60~<61 | 3 |
| 61~<70 | 10 |
| 70~<90 | 20 |
| 90~<120 | 30 |
| . | . |
| . | . |
| . | . |

Naturally, the recording intervals (DT) can be also set to regular intervals independent of the elapsed recording time, and various patterns are considered as a relation between the recording time and the recording interval (DT).

Returning to FIGS. 2 to 5, Subsequently, the system control microcomputer 9 discriminates whether the recording time counter indicates a value less than the recording interval (DT) or not (S10).

If the recording time counter indicates a value less than the recording interval (DT), the system control microcomputer 9 is returned to the process in S7. With respect to the image data (data) of next one frame, the system control microcomputer 9 writes the image data onto the recording medium 20 (S7), forms and adds each item of the sample tables (S8), determines the recording interval (DT) (S9), and discriminates the recording interval (DT) (S10). The data is sequentially processed every frame in this manner.

On the other hand, the system control microcomputer 9 executes a process in S11 if the recording time counter indicates a value which is equal to or larger than the recording interval (DT).

In S11, the system control microcomputer 9 forms the partial management file onto the memory 17 from the sample table for the partial management file on the memory 17. The system control microcomputer 9 enters the recording positions and the sizes into the FE of ABCD0001.DAT and the FE of the spare management file ABCD0001.MQ1. As mentioned above, the spare management file is a set of the recording positions and the sizes of one or a plurality of partial management files.

A construction of the partial management file will now be described.

Figure 7:
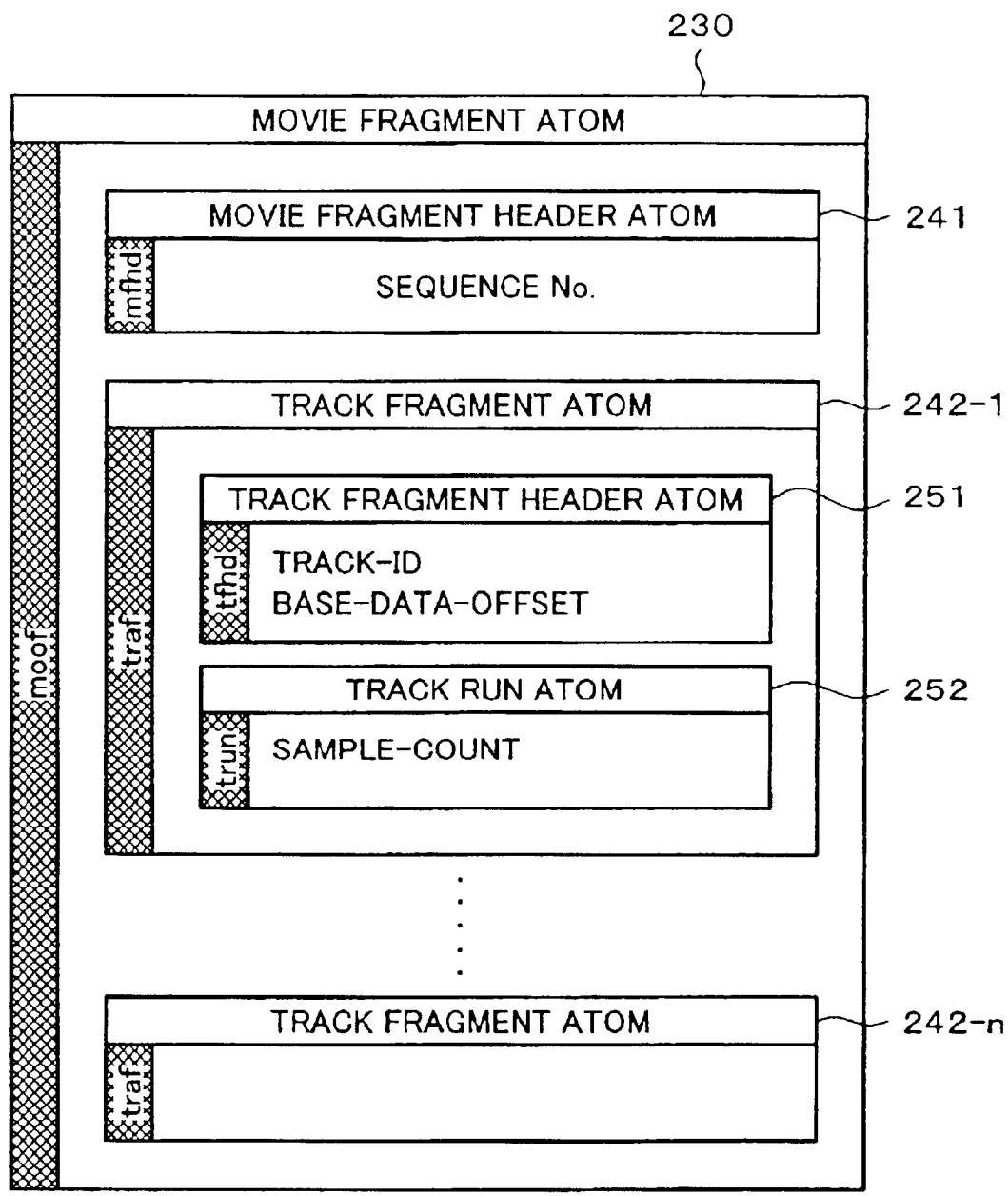
FIG. 7 is a diagram showing a construction of a movie fragment atom.

FIG. 7 is a diagram showing a construction of the partial management file.

In FIG. 7, a movie fragment atom 230 as a partial management file comprises a movie fragment header atom 241 and one or a plurality of track fragment atoms 242-1 to 242-n. The track fragment atoms 242 of the same number as that of the tracks are formed in accordance with the number of tracks. Each of the track fragment atoms 242 comprises a track fragment header atom 251 and a track run atom 252.

In the movie fragment header atom 241, the movie fragment atoms are described in forming order. For example, "1" is described in case of the movie fragment header atom of the movie fragment atom (moof#1) which has been formed first, and "2" is described in case of the movie fragment header atom of the movie fragment atom (moof#2) which has been formed second. Continuous numbers are described as mentioned above.

In the track fragment header a tom 251, the track-ID and a base-data-offset are described. The track-ID is an ID number of a track for specifying the track within a predetermined recording time, which will be explained hereinlater. For example, in FIGS. 3 and 8, the track-ID of the movie fragment atom (moof#1) is the number of the track in data#1. The base-data-offset is the recording position where the Data#n has been recorded on the recording medium 20. For example, in FIGS. 3 and 8, in the base-data-offset of the movie fragment atom (moof#1), LAD_1 showing the recording position on the recording medium 20 of data#1 is described. In the base-data-offset of the movie fragment atom (moof#2), LAD_2 showing the recording position on the recording medium 20 of data#2 is described.

Figure 8:
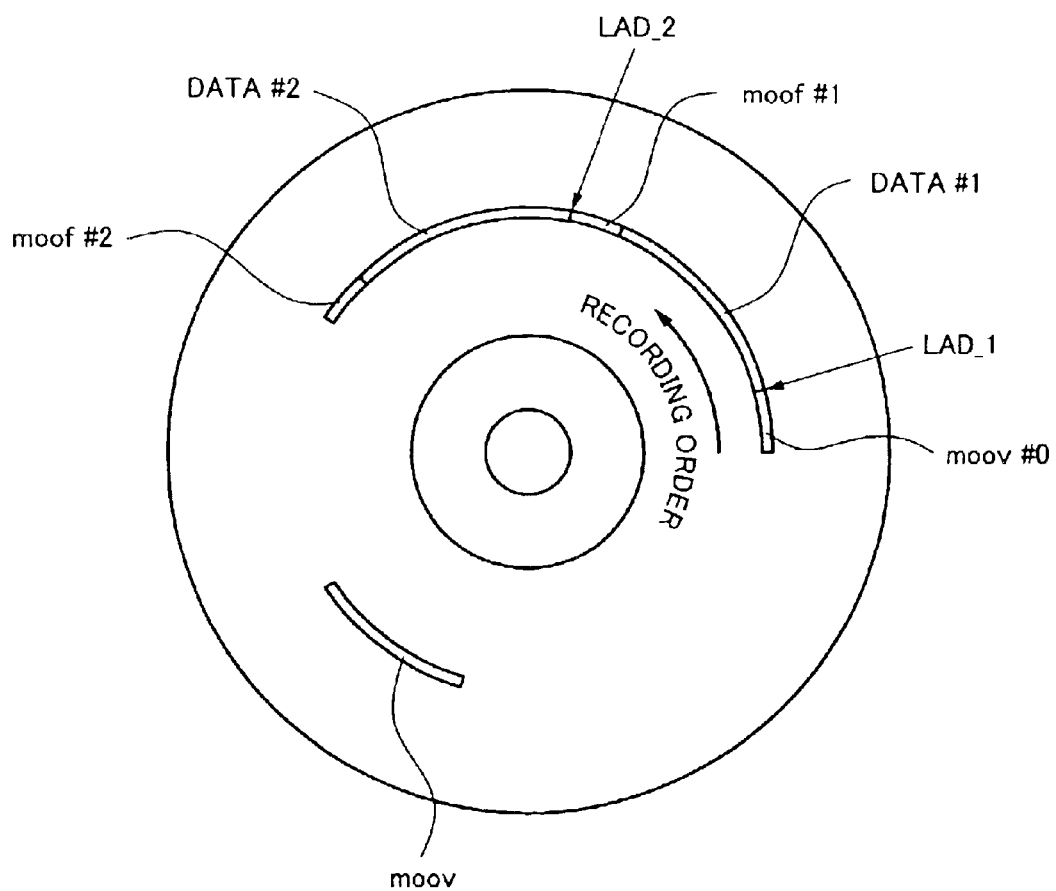
FIG. 8 is a diagram showing an arrangement of the data on the recording medium.

FIG. 8 is a diagram showing an arrangement of the data on the recording medium 20.

In the track run atom 252, a sample-count showing the number of samples which are obtained within a predetermined recording time is described. For example, in FIG. 3, n1 (positive integer) indicative of the number of samples is described in the sample-count of the movie fragment atom (moof#1).

When the size of sample is changed during the recording, it is described as a sample-size into the track fragment header atom.

Returning to FIGS. 2 to 5, subsequently, the system control microcomputer 9 discriminates whether the size of spare management file ABCD0001.MQ1 exceeds a preset specific value or not (S12). For example, the specific value is set to a sector size.

If the size of spare management file ABCD0001.MQ1 does not exceed the specific value, the system control microcomputer 9 writes the spare management file ABCD0001.MQ1 from the memory 17 onto the recording medium 20 (S13) and executes a process in S17.

If the size of spare management file ABCD0001.MQ1 exceeds the specific value, the system control microcomputer 9 assures an area for storing the FE of the next spare management file ABCD0001.MQ2 onto the memory (S14).

The system control microcomputer 9 enters the recording position and the size into the spare management file ABCD0001.MQ2 (S15).

The system control microcomputer 9 writes the data in the spare management file ABCD0001.MQ2 from the memory 17 onto the recording medium 20 (S16) and executes the process in S17.

In S17, the system control microcomputer 9 discriminates whether the recording has been finished or not. If the recording is not finished, the system control microcomputer 9 returns to the process in S6 and processes the image data of the next one frame. If the recording has been finished, a process in S18 is executed.

In S18, the normal management file is formed from the sample table of the normal management file ABCD0001.MQT and recorded onto the recording medium 20. The system control microcomputer 9 enters the recording position and the size of the normal management file ABCD0001.MQT into the FE of the normal management file ABCD0001.MQT (S18).

Subsequently, the system control microcomputer 9 records the normal management file ABCD0001.MQT and its FE from the memory 17 onto the recording medium 20 (S19) and finishes the process.

As mentioned above, the embodiment is characterized in that not only the normal management file ABCD0001.MQT as a file in which the contents of the initial moov atom 200 and the movie fragment atom 230 have been bound is formed and written onto the recording medium 20 but also the spare management file in which the recording position and the size of the initial moov atom 200 and the recording position and the size of the movie fragment atom 230 have been recorded is formed and written onto the recording medium 20.

Figure 9:
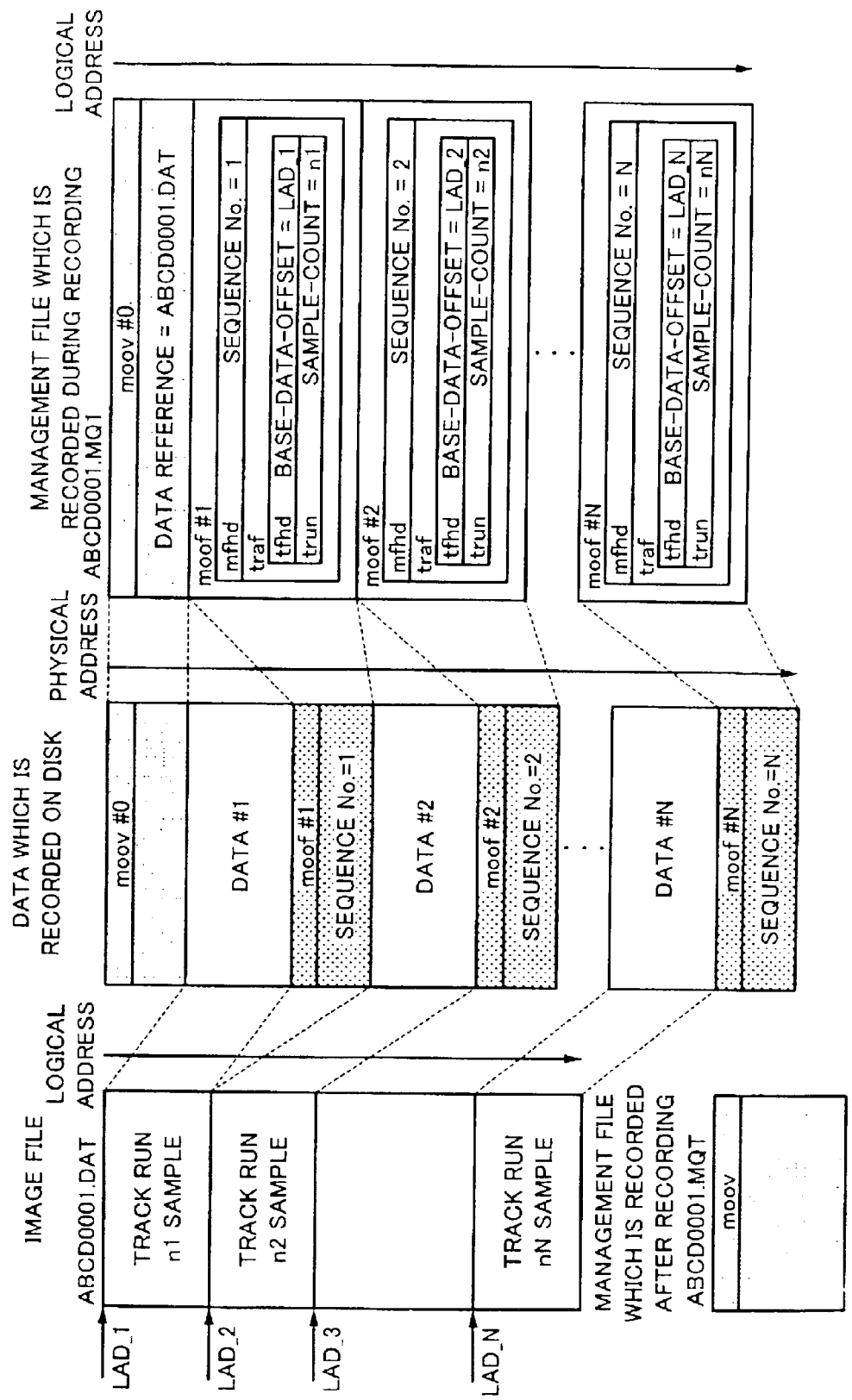
FIG. 9 is a diagram (part 2) showing relations among an image file, data which is recorded onto the recording medium, a partial management file which is recorded during the recording, and a normal management file which is recorded after completion of the recording.

According to the embodiment, although the spare management file has been divided into a plurality of files in accordance with the size, it is also possible to bind them to one spare management file and record it onto the recording medium 20. FIG. 9 is a diagram (part 2) showing relations among the image file, the data which is recorded onto the recording medium, the partial management file which is recorded during the recording, and the normal management file which is recorded after completion of the recording.

The case of reproducing the image data will now be described.

Figure 10:
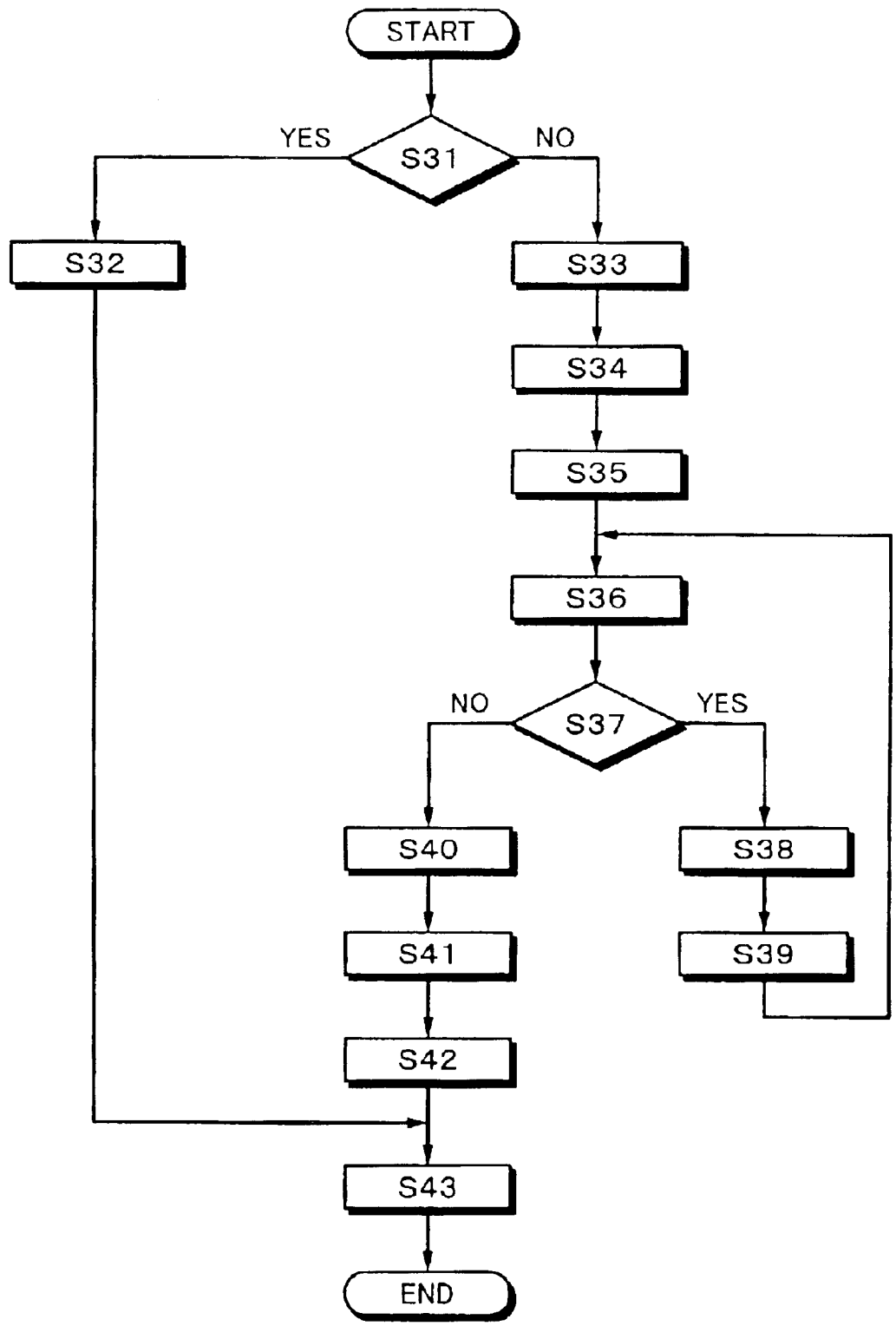
FIG. 10 is a diagram showing a flowchart in case of reproducing the QuickTime movie file from the recording medium 20.

FIG. 10 is a diagram showing a flowchart in case of reproducing the QuickTime movie file from the recording medium 20.

In FIG. 10, the system control microcomputer 9 discriminates whether the normal management file of the QuickTime movie file exists on the recording medium 20 or not. In this case, the system control microcomputer 9 can discriminate it by checking whether an identifier in which the different portion indicates the normal management file exists in the file name or not. In the embodiment, the system control microcomputer 9 can discriminate it by checking whether the file having MQT as an extension exists or not (S31).

If the normal management file exists on the recording medium 20, the system control microcomputer 9 reads out the image data from this normal management file on the recording medium 20 and starts the reproduction. In the embodiment, the system control microcomputer 9 reads out ABCD0001.DAT from the recording medium 20 and reproduces (S43).

On the other hand, if the normal management file does not exist on the recording medium 20, the system control microcomputer 9 sets a counter variable n to an initial value "1"(S33).

Subsequently, the system control microcomputer 9 reads the nth spare management file, that is, the first spare management file here from the recording medium 20. In this case, the system control microcomputer 9 can discriminate it by checking whether an identifier in which the different portion indicates the spare management file exists in the file name or not. In the embodiment, the system control microcomputer 9 can discriminate it by checking whether the file having MQn as an extension exists or not.

Subsequently, the system control microcomputer 9 reads out the substance of the initial moov atom 200 and the substance of the movie fragment atom 230 from the spare management file and stores them into the memory 17 on the basis of the recording position and the size of the initial moov atom 200 and the recording position and the size of the movie fragment atom 230. The system control microcomputer 9 reconstructs the normal management data of the QuickTime movie file and stores them into the memory 17 on the basis of the substance of the initial moov atom 200 and the substance of the movie fragment atom 230 (S35).

Subsequently, the system control microcomputer 9 increases the counter variable n (S36).

Subsequently, the system control microcomputer 9 discriminates whether the (n+1)th spare management file, that is, the second spare management file here exists on the recording medium 20 or not (S37).

If the (n+1)th spare management file exists, the system control microcomputer 9 reads out the (n+1)th spare management file from the recording medium 20 (S38).

Subsequently, the system control microcomputer 9 reads out the substance of the initial moov atom 200 and the substance of the movie fragment atom 230 from the spare management file and stores them into the memory 17 on the basis of the recording position and the size of the initial moov atom 200 and the recording position and the size of the movie fragment atom 230. The system control microcomputer 9 reconstructs the management data of the QuickTime movie file and additionally stores them into the memory 17 on the basis of the substance of the initial moov atom 200 and the substance of the movie fragment atom 230. The system control microcomputer 9 returns to the process in S36 for increasing the counter variable n (S39).

If the (n+1)th spare management file does not exist, the system control microcomputer 9 forms the normal management file from the management file of the QuickTime movie file stored in the memory (S40).

The system control microcomputer 9 assures an area for storing the FE of the normal management file into the memory and enters the recording position and the size of the normal management file into the FE of the normal management file (S41).

Subsequently, the system control microcomputer 9 records the FE of the normal management file from the memory 17 onto the recording medium 20 (S42) and, thereafter, executes a process in S43.

If the normal management file cannot be read out due to the fault (disk crash) which occurred on the recording medium 20 as mentioned above, the normal management file is recorded again from the spare management file onto the recording medium 20.

Although the embodiment has been mentioned with respect to the case where the digital recording and reproducing apparatus is mounted into the portable disk recording and reproducing apparatus of the camera integrated type, the invention is not limited to it. The digital recording and reproducing apparatus of the invention can be not only used solely but also implemented into a computer in which QuickTime application software operates. The invention can be applied to not only a case of handling video data and audio data but also a case of handling only the video data or the audio data and, further, a case of handling text data.

Although the MPEG, QuickTime, and UDF have been used in the embodiment, the invention is not limited to them. For example, Open DML Motion JPEG, H.263, DV, AVI (Audio/Video Interleaved), etc. can be also used as a compression/decompression system. Video for Windows can be used as an application along the time base. FAT (File Allocation Table) can be used as a file system.

Although the common portion of each file name has been set to "ABCD0001" and the identifying portion to identify each file has been set to DAT, MQT, or MQn in the embodiment, the invention is not limited to them. They can be also arbitrarily set. As another example, it is also possible that the common portion is set to "PNCD", the identifying portion of the real data such as image data, audio data, etc. is set to "FIL", the identifying portion of the normal management file is set to "MEO", and the identifying portion of the spare management file is set to "MEn (n is a positive integer of 1 or larger).

What is claimed is:

1. A data recording method comprising:
   a first step of generating first management files for managing time-sequential data at predetermined time intervals and sequentially writing said first management files onto a recording medium;
   a second step of generating a second management file having recording positions and sizes on said recording medium with respect to all of the first management files and writing said second management file onto said recording medium;
   a third step of generating a third management file for managing all of the time-sequential data and writing said third management file onto said recording medium; and
   a fourth step of generating a duplicate third management file on the basis of said second management file when said third management file does not exist or cannot be read.

2. A data recording method according to claim 1, further comprising a fifth step of writing the duplicate third management file onto said recording medium.

3. A data recording method according to claim 1, wherein said second step further includes a step of dividing said second management file into a plurality of files each having a predetermined size.

4. A data recording method according to claim 3, wherein file names of said divided second management files include continuous numbers.

5. A data recording method according to claim 4, wherein in said fourth step, said second management files are readout in order from said recording medium in accordance with said continuous numbers.

6. A data recording method according to claim 1, wherein the respective file name of the file of said time-sequential data, said second management file, and said third management file is constructed by a portion which is common to all of said files and a portion that is not common to all of said files.

7. A data recording method according to claim 6, wherein said portion that is not common to all of said files is an extension.

8. A data recording method according to claim 1, wherein there are a plurality of said predetermined time intervals.

9. A data recording method according to claim 1, wherein said predetermined time interval changes in accordance with an elapsed time from the start of generating the time-sequential data.

10. A data recording method according to claim 1, wherein said predetermined time interval increases in accordance with an elapsed time from starting generation of the time-sequential data.

11. A data recording apparatus comprising:

first means for generating first management files for managing time-sequential data at predetermined time interval and sequentially writing said first management files onto a recording medium;

second means for generating a second management file having recording positions and sizes on said recording medium with respect to all of said first management files and writing said second management file onto said recording medium;

third means for generating a third management file for managing all of the time-sequential data and writing said third management file onto said recording medium; and fourth means for generating a duplicate third management file on the basis of said second management file when said third management file does not exist or cannot be read.

12. A data recording apparatus according to claim 11, further comprising fifth means for writing said duplicate third management file onto said recording medium.

13. A data recording apparatus according to claim 11, wherein said second means further includes means for dividing said second management file into a plurality of files each having a predetermined size.

14. A data recording apparatus according to claim 11, wherein the respective file name of the file of said time-sequential data, said second management file, and said third management file is constructed by a portion which is common to all of said files and a portion that is not common to all of said files.

15. A data recording apparatus according to claim 11, wherein there are a plurality of said predetermined time intervals.

16. A data recording apparatus according to claim 11, wherein said predetermined time interval changes in accordance with an elapsed time from starting generation of the time-sequential data.

17. A computer-readable recording medium that stores:

a plurality of first management files, each for managing a part of time-sequential data;

a second management file, having recording positions and sizes with respect to all of the first management files;

a third management file, for managing all of the time-sequential data that has been written; and program code for generating a duplicate third management file as a function of the second management file.

* * * * *